Figure 1:
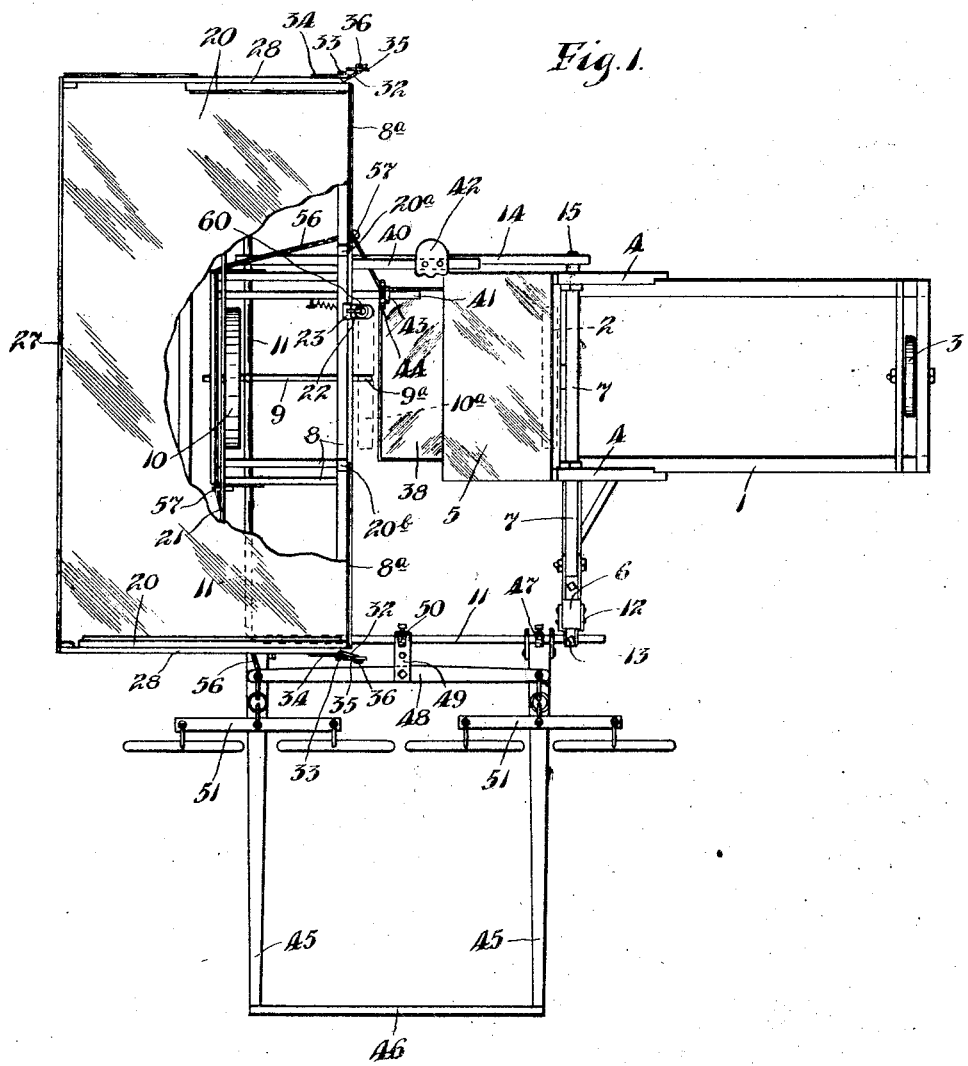

J. J. PAYER.
BUNDLE CARRYING ATTACHMENT FOR GRAIN HARVESTERS.
APPLICATION FILED FEB. 10, 1912.

1,090,338.

Patented Mar. 17, 1914.
5 SHEETS—SHEET 1.

Witnesses.
H. L. Opsahl.
Geo. Knutson

Inventor.
Jacob J. Payer,
By his Attorneys,
Williamson & Merchant

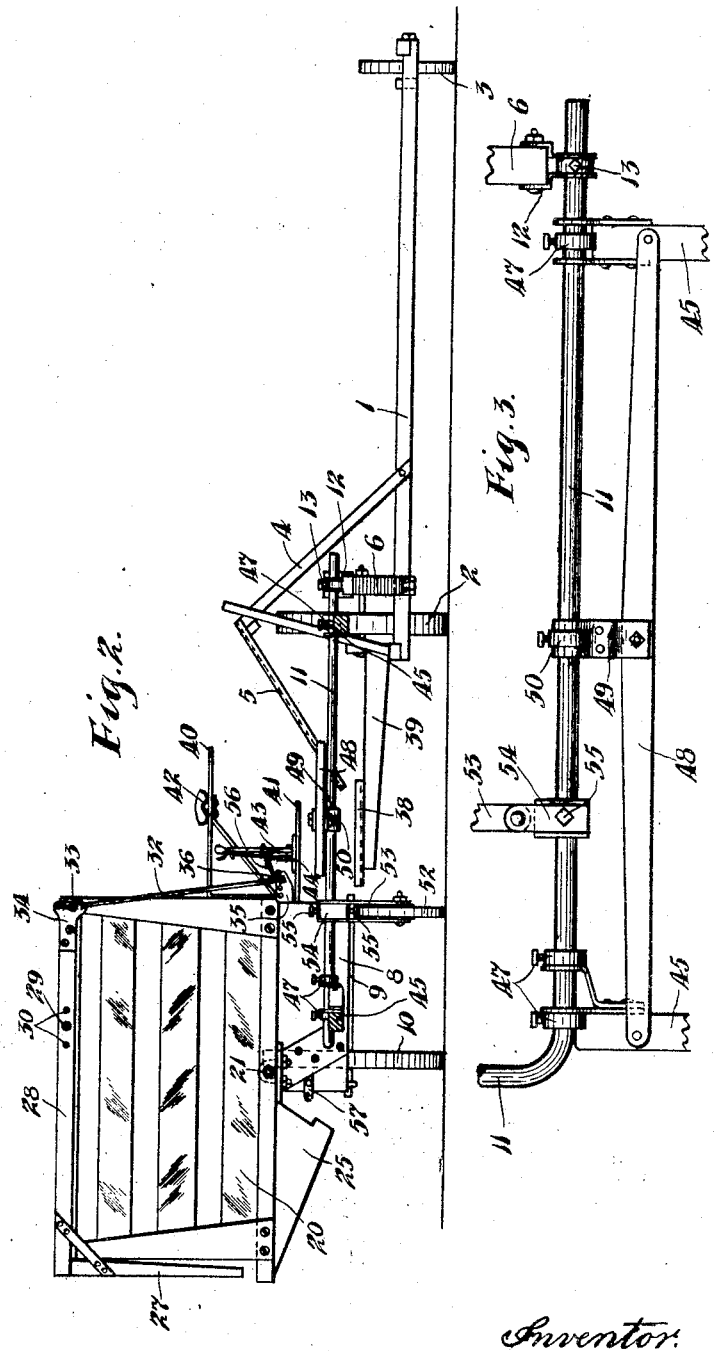

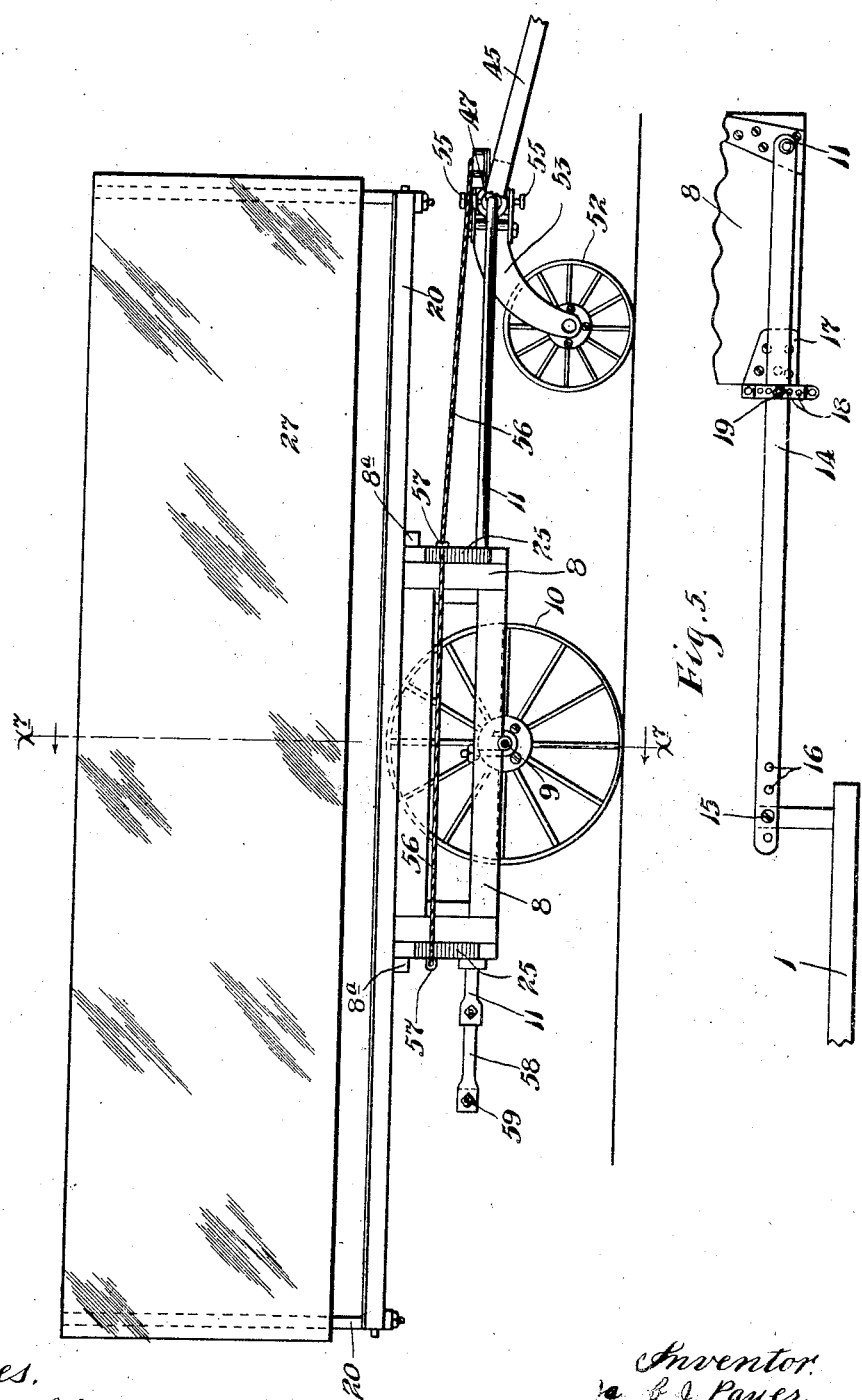

J. J. PAYER.
BUNDLE CARRYING ATTACHMENT FOR GRAIN HARVESTERS.
APPLICATION FILED FEB. 10, 1912.
1,090,338.
Patented Mar. 17, 1914.
5 SHEETS—SHEET 4.
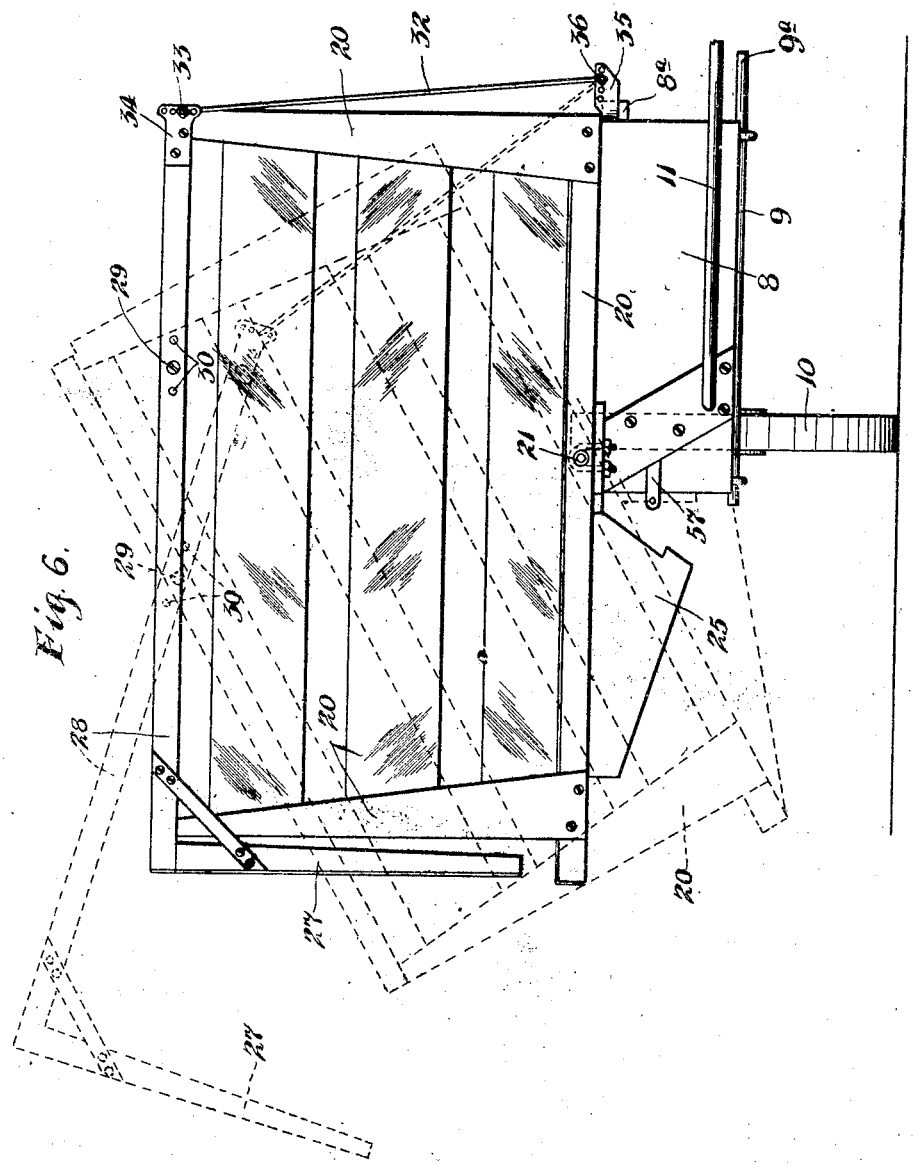

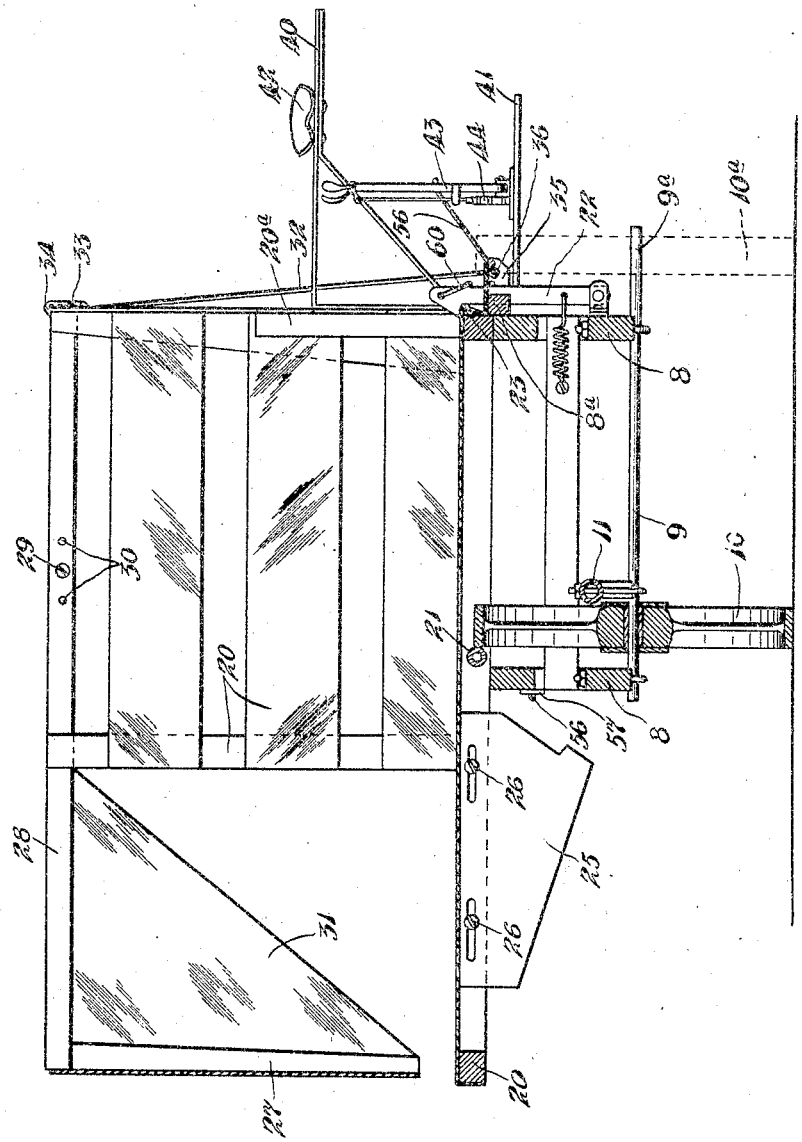

UNITED STATES PATENT OFFICE.

JACOB J. PAYER, OF ADAMS, NORTH DAKOTA.

BUNDLE-CARRYING ATTACHMENT FOR GRAIN-HARVESTERS.

1,090,338.

Specification of Letters Patent.

Patented Mar. 17, 1914.

Application filed February 10, 1913. Serial No. 676,814.

*To all whom it may concern:*

Be it known that I, JACOB J. PAYER, a citizen of the United States, residing at Adams, in the county of Walsh and State of North Dakota, have invented certain new and useful Improvements in Bundle-Carrying Attachments for Grain-Harvesters; and I do hereby declare the following to be a full, clear, and exact description of the invention, such as will enable others skilled in the art to which it appertains to make and use the same.

My invention has for its object to provide a bundle carrying attachment for grain harvesters, which attachment has a large carrying capacity, so that a large number of bundles may be carried with the harvester and then deposited in a large load.

Hitherto, harvesters have been equipped with bundle carriers adapted to carry a small number of bundles which are deposited along the line of travel in loose shocks and are subsequently picked up and carried directly to the threshing machine. Under this arrangement, the field is covered with shocks of grain so that the field cannot be plowed until after the shocks of grain are conveyed therefrom, which is usually after the grain has been threshed.

A threshing machine and crew is seldom available just at the time that the grain is harvested, and the result has been that delay in threshing has delayed the plowing of the ground until late, and at which time, because of the rays of the sun being no longer hot, the ground is never properly sun cured after having been plowed. In fact, in most land where grain is raised, it is never properly sun cured unless it is given up for a season for the sole purpose of sun curing the same. Now it happens that all this trouble and a great deal of the decrease in quality which has taken place in land where grain is raised, would be overcome if plowing should take place immediately after the grain is harvested or cut. My invention meets this condition and provides a bundle carrier by the use of which, the grain, as it is cut and bound, may be carried in large loads to some particular place on the land or to several places, but comparatively few in number and occupying but very little ground, where the grain may be later threshed, whenever a threshing machine and crew is available. Also, it results from this operation that nearly all or a main portion of the field is cleared of bundles and shocks, so that the farmer may proceed to plow the ground immediately after he has cut his grain and while he is waiting for the threshing machine. When the ground is plowed early in the fall or late summer, as is above made possible, weeds will commence to grow and will be frost or winter killed before they have had time to mature and again go to seed.

My invention also provides means for catching loose or shelled grain which has been threshed by the binding operation and which is usually wasted by being dropped to the ground off from the binding deck.

Also, the invention provides means for equalizing the draft between the harvester and the bundle carrying attachment, whereby the horses are relieved from side draft. Obviously, the very act of relieving the horses from side draft, very greatly reduces the pulling draft, so that not a great deal more power is required to pull the harvester with my improved attachment than is required to pull an ordinary harvester with side draft. Furthermore, the journals of the carrying wheels being relieved from side draft and subject to direct pull, will wear longer.

In the improved machine illustrated, the accompanying drawings indicate like parts throughout the several views.

Referring to the drawings, Figure 1 is a plan view showing a harvester in diagram or outline and showing my improved bundle carrier attachment and auxiliary devices connected to the harvester; Fig. 2 is a front elevation of the complete machine shown in Fig. 1, some parts being sectioned and some parts being broken away; Fig. 3 is an enlarged plan view showing the manner in which the draft devices are connected to the machine; Fig. 4 is a right side elevation of the bundle carrying attachment; Fig. 5 is a detail view in rear elevation, some parts being broken away, showing the rear connection between the bundle carrier attachment and the frame of the harvester; Fig. 6 is a view in front elevation showing by full lines the position of the rack of the bundle carrier, and by dotted lines showing the position of the rack when in a dumping position; and Fig. 7 is a transverse section taken through the bundle carrying attachment on the line $x^7$ $x^7$ on Fig. 4.

The harvester may be assumed to be of any of the well known commercial types, the binder and certain other parts of which are removed. Of the parts of the harvester, as shown, it is for the purpose of this case only necessary to note, the platform frame 1, the main or traction wheel 2, the grain wheel 3, the elevator frame 4, and the binder deck 5. In this arrangement, the harvester frame 1 is provided with a short forwardly projecting pole 6, rigidly secured thereto and preferably also, to the front end of a rearwardly extended brace bar 7, which latter is also rigidly secured to the said harvester frame 1.

The numeral 8 indicates a rectangular supplemental truck frame which constitutes the truck frame of the bundle carrying attachment and is located just outward of the binder deck 5 and is connected to the harvester frame, by means presently to be described. This truck frame 8 is provided with a transversely extended intermediate axle 9 that is in axial alinement approximately with the axis of the main wheel 2 of the harvester. Journaled on the axle 9 is a large truck wheel 10, preferably of the same diameter as the main wheel 2. The grain wheel 3 is of smaller diameter than the wheels 2 and 10, but its axis lies in the same transverse vertical plane. This arrangement of the wheels facilitates turning of the machine.

The numeral 11 indicates a long and heavy coupling bar, preferably in the form of a metal pipe, the front portion of which extends transversely of the machine and the main body portion of which extends from front to rear of the machine and is passed through and rigidly secured to the truck frame 8.

To connect the inner front end of the coupling bar 11 to the harvester, the stud pole 6 at its front end is provided with a coupling head 12 having a perforation through which the end of said bar is passed, and, in which, the said bar is rigidly secured by a set screw 13, with freedom for adjustments transversely of the machine. It may be here stated, that the adjustment of the said bar 11 and the head 12 should be such that on a second trip around or across the field, the wheel 10 will run on the track made by the main binder wheel 2. Otherwise stated, the adjustment should be such that the distance between the wheels 2 and 10 is equal to the width of the swath cut by the harvester.

At the rear end of the machine, the rear end of the coupling bar 11 is pivotally secured to the outer end of a transverse tie bar 14 (see Fig. 5), the inner end of which tie bar is pivotally connected by a bolt 15, or otherwise, to a suitable portion of the harvester frame 1. As shown, the bolt 15 is passed through any one of several perforations 16 in the bar 14 and is secured to the rear end of the brace bar 7. The perforations 16 make it possible to adjust the rear portion of the bundle carrier truck to correspond to the adjustment of the front end portion thereof, which, as already stated, is accomplished by endwise adjustments of the transverse front end portion of the tie bar 11, through the head 12. Also, the adjustments at front and rear, just noted, make it possible to set the wheel 10 parallel to the wheel 2.

At its rear inner corner, the truck frame 8 is provided with a bifurcated bracket 17, through which the intermediate portion of the rear tie bar 14 is passed. The bifurcated portion of this bracket 17 is provided with vertically spaced perforations 18, through any one of which, and the said tie bar 14, a nut-equipped bolt 19 is passed. Adjustment of the bolt 19 in the perforations 18, makes it possible to set the truck frame 8 and the rack carried thereby, presently described, normally level, regardless of whether the harvester frame 1 is set high up or low down, as required for cutting long and short grain. To provide for this same adjustment at the front of the machine, the coupling head 12 is made vertically adjustable, either by making the same adjustable on the end of the pole 6 or by making the end of the said pole 6 vertically adjustable with the said head.

A large bundle carrying rack or box 20 is carried on and pivotally connected to the truck frame 8, as shown, by a forwardly and rearwardly extended rod or pipe 21, that is located slightly inward of the center of gravity of said rack, so that the said rack, when released, will automatically tilt downward at its outer portion and thereby dump its load. The parts are so constructed, however, that in spite of the location of the rod 21, the rack will be normally held in its receiving position by gravity when unloaded. The dumping movement is prevented when the rack is loaded by a spring-held latch 22, the hook-like beveled end of which (see Fig. 7) normally engages with a projecting detent 23 shown as formed to a projecting ledge of the platform or bottom structure of the said rack. The outer side of the rack 20 is open and the inner side thereof is more or less open, being, as shown, cut away down to the platform between the points marked 20$^a$—20$^b$ on Fig. 1. Downward tilting or dumping movements of the rack are limited by suitable stop devices such as the stop boards 25, adjustably secured to the platform structure of the rack by slot and bolt connections 26. These so-called stop boards 25 engage the outer side portion of the truck frame 8 and, by adjustments of the said stops 25, extreme dumping or tilting movements of the rack may be varied, at will.

The outer side of the rack is normally closed by a movable side section 27 made by the outer ends of a pair of lever bars 28, intermediately pivoted to the upper portions of the front and rear ends of the rack, preferably by bolts 29 inserted through any of several perforations 30, both in the levers and in the upper rails of the ends of the said rack. By inserting the bolt 29 into different perforations 30, the lifting action of the levers on the movable side 27 may be varied, and the effect of the weight of the movable side on the rack may be varied.

By reference to Fig. 7, it will be noted that the rear end of the rack extends only part way outward toward the outer edge of the bottom of the rack, and it will also be noted that the rear lever 28 carries a stop plate 31, which, in part, closes the opening left by the shortness of the said rear end. Connections to the levers 28 are provided whereby, when the rack is tilted into a dumping position shown by dotted lines in Fig. 6, the movable side 27 will be automatically raised into such position that the entire load may freely slide off from the platform of the rack under the said raised side 27. The connections for this purpose are preferably in the form of rods 32, the upper ends, of which, are connected to the inner ends of said levers 28, preferably by nut-equipped bolts 33 passed through any one of the several perforations of the coupling heads 34, rigidly secured to the inner ends of the said levers. The lower ends of the rods 32 are adjustably pivoted to end brackets 35, rigidly secured to the projecting ends of a long beam 8ª of the truck frame 8. The adjustable connection between the rods 32 and brackets 35 are preferably made by bolts 36 passed through any one of several horizontally spaced perforations in the said brackets 35. Adjustments of the bolt 33 vary the normal distance of the lower edge of the adjustable rack side 27 in respect to the bottom of the rack. Adjustment of the bolts 36 in the perforations of the brackets 35 varies the leverage action which takes place when the rack and levers return from the dotted line position in Fig. 6, and thereby varies the pulling effect of the rod 32 which tends to aid in returning the rack to normal position. Otherwise stated, the rack, with its pivot 21 located at a certain point, has a certain tendency when loaded to tilt into a dumping position, and this dumping movement is to some extent resisted by the weight of the levers 28 and rack side 27 carried thereby, acting through the connecting rods 32. In practice, it has been found that to make the rack automatically dump just at the right time and to return properly under the action of gravity after the load is dumped, requires a very nice adjustment of the pivotal connection between the lower ends of the links 32 and the brackets 35 or other parts to which they are pivotally connected at their lower ends. The adjustment of the pivot at 36, above described, enables the parts to be so adjusted and set that they will operate correctly.

Located just inward of the bundle carrying attachment and in position to receive shelled or loose grain from the binder deck 5, is a large grain receiving pan 38, which serves as a platform, also to receive the bundles from the binder. This grain pan or platform 38 is supported by the outer ends of a pair of beams 39, the inner ends of which are rigidly secured to the adjacent end of the binder frame 1.

The numeral 40 indicates a seat support and the numeral 41 a combined foot rest and lever support, both of which are carried by the truck frame 8 and are located just at the rear of the grain pan or platform 38. As shown, an operator's seat 42 is mounted on the support 40, and a latch lever 43 and coöperating lock segment 44 are mounted on the support 41.

Two poles 45, connected at their front ends by a tie bar 46, are pivotally mounted on the transverse front portion of the coupling bar 11. These poles 45 are made laterally adjustable on the bar 11 by suitable collars 47 provided with set screws, by means of which they are adjustably secured on the said bar 11. An equalizer draft beam 48 is intermediately pivoted to a draw bar 49, which, in turn, is pivoted on the transverse front portion of the coupling bar 11 and is adjustable thereon, transversely of the machine, being held in working position by a collar 50, having a suitable set screw for securing it in different positions on the said bar 11. The ends of the equalizing bar 48 preferably rest upon the rear end of the poles 45, and they are connected, as shown, to doubletrees 51. With this arrangement, one horse will be located on each side of both of the poles, that is, two of the horses will be located between the poles and two outside of the poles. The above noted lateral adjustments of the poles 45 and of the equalizing bar or evener 48, makes it possible to set the horses where they will draw the entire machine without side draft.

The numeral 52 indicates a caster wheel journaled to the lower rear end of a caster wheel arm 53, the upper end of which is pivoted to a head bracket 54, which, in turn, is rigidly secured to but laterally adjusted on the front transverse portion of the coupling bar 11. The said head 54, as shown, is adjustably secured to the bar 11 by several set screws 55 (see particularly Figs. 2 and 3). In turning the machine, the caster wheel 52 will, of course, oscillate and follow the machine without resistance. When the machine is turned, it moves on the main harvester wheel 2 as a pivot unless, of course, the machine be drawn ahead while it is being turned. The machine, when turning a corner in the field, will turn toward the left, in respect to the driver, and to insure the turning of a short or square corner, I provide a device for causing the outer or right hand pair of horses to do the pulling. This device preferably involves a long cable 56, the front end of which is attached to the right hand or outer end of the equalizer bar 48, and the rear end of which is attached to the before noted latch lever 43. The intermediate portion of this cable 56 is passed over suitable guides 57 on the truck frame 8. When the corner is to be turned, as above stated, the lever 43 will be thrown forward, thereby causing the outer pair of horses to do the pulling, while the inner pair of horses are pulled back by the reins, to prevent them from pulling. When this is done, the outer horses will turn the machine on the wheel 2 as a pivot, simply by a direct pulling action due to the fact that they are located far outside of the center of draft of the machine and far outward of the said wheel 2. Hence, the machine may be turned without pulling the neck yokes.

The complete machine, above described, is too wide to pass over an ordinary country bridge or through an ordinary gate, and hence I provide means for detaching the bundle carrying attachment from the harvester and connecting the same to and in front of the harvester, so that the two will be drawn in tandem. For the above purpose, I consistently attach a short draw bar 58 to the rearwardly projecting end of the coupling bar 11. The bundle carrying attachment may be disconnected from the harvester very easily, simply by removing the bolt 15 (see Fig. 5) and drawing the front end of the coupling bar 11 out of the coupling head 12 while the set screw 13 is loosened. This being done, the bundle carrying attachment is moved in front of the harvester and the rear end of the draw bar 58 is, by means of a bolt 59, coupled to the head 12 of the stub pole 6. The bundle carrying attachment and harvester will then be drawn in tandem or one ahead of the other, and they will then pass through any opening or over any bridge which an ordinary harvester may pass.

To maintain a good balance of the bundle carrying attachment while used, as above stated, it is desirable to attach an auxiliary wheel 10ª of the same diameter as the wheel 10 to the inner end 9ª of the axle 9. This wheel 10ª is indicated by dotted lines in Figs. 1 and 7.

As before stated, the bundles, as well as the shelled or lose grain will be delivered from the binder onto the grain pan or platform 38. The operator, while seated in the seat 42 with his feet resting on the foot rest 41, will, by means of a fork, easily throw the bundles from the pan 38 into the dumping rack, about as fast as they are delivered from the binder. If, however, the horses require his attention, or for other reasons, his attention is required for a short time, the bundles will accumulate in the said pan 38 and may be later thrown into the rack.

When the rack has been loaded and driven to a place where the bundles are to be dumped, all that is necessary in order to trip and release the rack, is to pull on the latch 22, the said latch, as shown, being provided at its upper end with a ring or hand piece 60. This being done, the rack will dump itself automatically, and when the load has been dumped, it will be automatically returned by gravity to its normal position, and the latch 22 will automatically be reëngaged with the detent 23, thereby locking the rack in its normal position. If desired, the seat 42 may be dispensed with and the operator may sit upon, or rest himself against the bar 40, and the latter will serve to support him while he reaches the various levers of the harvester and bundle carrying attachment.

What I claim is:

1. A bundle carrying attachment for harvesters and the like, comprising a laterally tilting rack having a vertically movable side member, connections whereby said side member is automatically actuated by the tilting movement of the rack, a support for said rack located inward of the median line thereof whereby the rack may be tilted by the weight of its contents, said movable side member and connections adapted to automatically return the rack to receiving position after the contents have been discharged.

2. A bundle carrying attachment for harvesters and the like, comprising a laterally tilting rack, a support for said rack located inward of the median line thereof whereby the rack may be tilted by the weight of its contents, said rack having a vertically movable side member, levers pivoted to the ends of said rack and carrying said movable side, and connections between said levers and a fixed portion of the construction whereby said movable side is automatically actuated by the tilting movement of the rack, said movable side and connections adapted to automatically return the rack to receiving position after its contents have been discharged.

3. A bundle carrying attachment for harvesters and the like, comprising a laterally tilting rack provided with a vertically movable side member, levers having an intermediate pivotal connection with the ends of the rack and carrying said movable side, and connections between the inner ends of said levers and a fixed part of the attachment whereby said movable side is automatically actuated by the tilting movement of the rack, said levers, connections and the movable side adapted to automatically return the rack to receiving position when the contents of the rack have been discharged, said pivotal connection between the levers and the rack being adjustable transversely of the rack, for the purpose described.

4. A bundle carrying attachment for harvesters and the like, comprising a laterally tilting rack provided with a vertically movable side member, levers intermediately pivoted to the ends of said rack and carrying said movable side, and means connecting the inner ends of said levers with a fixed part of the attachment, whereby said movable side is automatically actuated by a tilting movement of the rack, the connection between the levers and said means being adjustable to vary the normal height of said movable side.

5. A bundle carrying attachment for harvesters and the like, comprising a laterally tilting rack provided with a vertically movable side member, levers having an intermediate pivotal connection with the ends of the rack and carrying said movable side, and means connecting the inner ends of said levers with a fixed part of the attachment whereby said movable side is automatically actuated by a tilting movement of the rack, said movable side, levers and means connecting the levers with the attachment being adapted to automatically return the rack to receiving position, the connection between said means and said fixed part being adjustable to vary the effect of the weight of the movable side on the rack.

In testimony whereof I affix my signature in presence of two witnesses.

JACOB J. PAYER.

Witnesses:
 F. D. MERCHANT,
 HARRY D. KILGORE.